(12) United States Patent
Motoda et al.

(10) Patent No.: US 11,942,852 B2
(45) Date of Patent: Mar. 26, 2024

(54) ENERGIZING TERMINAL ASSEMBLY AND ELECTRIC DRIVE DEVICE

(71) Applicant: Hitachi Automotive Systems, Ltd., Hitachinaka (JP)

(72) Inventors: Haruaki Motoda, Hitachinaka (JP); Kiyotaka Kanno, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 724 days.

(21) Appl. No.: 17/057,827

(22) PCT Filed: Mar. 20, 2019

(86) PCT No.: PCT/JP2019/011655
§ 371 (c)(1),
(2) Date: Nov. 23, 2020

(87) PCT Pub. No.: WO2019/235024
PCT Pub. Date: Dec. 12, 2019

(65) Prior Publication Data
US 2021/0218312 A1    Jul. 15, 2021

(30) Foreign Application Priority Data
Jun. 6, 2018    (JP) .................................. 2018-108457

(51) Int. Cl.
*H02K 3/50*    (2006.01)
*H02K 3/52*    (2006.01)
(Continued)

(52) U.S. Cl.
CPC .............. *H02K 5/225* (2013.01); *H02K 3/50* (2013.01); *H02K 3/52* (2013.01); *B62D 5/0424* (2013.01);
(Continued)

(58) Field of Classification Search
CPC .... H01R 4/5075; H01R 12/57; H01R 4/5041; H02K 5/225; H02K 11/33; H02K 11/30;
(Continued)

(56) References Cited

U.S. PATENT DOCUMENTS 4,175,810 A     11/1979  Holt
9,479,030 B2 *  10/2016  Motoda ................ B62D 5/0406
(Continued)

FOREIGN PATENT DOCUMENTS

JP    S62-002291 U    1/1987
JP    2016-036243 A   3/2016
(Continued)

OTHER PUBLICATIONS

International Search Report with English translation and Written Opinion issued in corresponding application No. PCT/JP2019/011655 dated Jul. 2, 2019.

*Primary Examiner* — Alexander A Singh
(74) *Attorney, Agent, or Firm* — Foley & Lardner LLP

(57) ABSTRACT

An object of the present invention is to obtain good electrical connection with respect to an insertion-side terminal having a large variation in a position.
An energizing terminal assembly according to the present invention includes: a first energizing terminal 59 which constitutes an accommodation-side terminal of a press-fit type connector and has a sandwiching portion 59D; and a second energizing terminal which constitutes an insertion-side terminal of the press-fit type connector and is inserted into the sandwiching portion 59D to be sandwiched by the sandwiching portion 59D, wherein the sandwiching portion 59D has a groove-shaped portion 59E whose width dimension W and depth dimension D1 decrease from an inlet side
(Continued)

of the second energizing terminal in an insertion direction toward a deep side of the second energizing terminal in the insertion direction.

6 Claims, 12 Drawing Sheets

(51) Int. Cl.
*H02K 5/22* (2006.01)
*B62D 5/04* (2006.01)
*B62D 6/10* (2006.01)
*H01R 4/50* (2006.01)
*H02K 11/33* (2016.01)

(52) U.S. Cl.
CPC .............. *B62D 5/0463* (2013.01); *B62D 6/10* (2013.01); *H01R 4/5041* (2013.01); *H01R 4/5075* (2013.01); *H02K 11/33* (2016.01); *H02K 2211/03* (2013.01)

(58) Field of Classification Search
CPC ........ H02K 7/14; H02K 2211/03; H02K 3/50; H02K 3/52; B62D 5/0406; B62D 5/0463; B62D 6/10; B62D 5/0424
USPC .......................................................... 310/71
See application file for complete search history.

(56) References Cited

U.S. PATENT DOCUMENTS

| | | | |
|---|---|---|---|
| 10,418,737 B2 * | 9/2019 | Sunaga | ................ H01R 13/113 |
| 2016/0036306 A1 * | 2/2016 | Yamasaki | .............. H02K 5/225 |
| | | | 310/71 |
| 2019/0028004 A1 | 1/2019 | Hamada | |
| 2019/0280567 A1 | 9/2019 | Hattori | |

FOREIGN PATENT DOCUMENTS

| | | |
|---|---|---|
| JP | 2017-157418 A | 9/2017 |
| WO | WO-2018/096710 A1 | 5/2018 |

* cited by examiner

ENERGIZING TERMINAL ASSEMBLY AND ELECTRIC DRIVE DEVICE

TECHNICAL FIELD

The present invention relates to an energizing terminal assembly that connects an electrical wiring and an electric drive device that connects a winding terminal of an electric motor using the energizing terminal assembly.

BACKGROUND ART

A connection terminal assembly of JP 2017-157418 A (PTL 1) has been known as a background art of the present technical field.

PTL 1 discloses a connection terminal assembly in which a split terminal piece is configured by bisecting a connector-side terminal in an insertion direction of the connector-side terminal and the split terminal piece is inserted into an elastic terminal piece of a substrate-side terminal to electrically connect both the terminals to each other (see Abstract).

CITATION LIST

Patent Literature

PTL 1: JP 2017-157418 A

SUMMARY OF INVENTION

Technical Problem

In the connection terminal assembly of PTL 1, rigidity of the split terminal piece is reduced by bisecting a flat plate-shaped connector-side terminal, and the split terminal piece is easily deformed along a shape of the substrate-side terminal. However, in PTL 1, it cannot be said that a variation in a position of the connector-side terminal (insertion-side terminal) has been sufficiently considered. For example, in a case where a winding terminal of an electric motor is inserted and connected into the substrate-side terminal, the winding terminal has a large variation in a lead-out position, such that it is not guaranteed that good electrical connection will be obtained.

An object of the present invention is to obtain good electrical connection with respect to an insertion-side terminal having a large variation in a position.

Solution to Problem

In order to achieve the above object, an energizing terminal assembly according to the present invention includes: a first energizing terminal which constitutes an accommodation-side terminal of a press-fit type connector and has a sandwiching portion; and a second energizing terminal which constitutes an insertion-side terminal of the press-fit type connector and is inserted into the sandwiching portion to be sandwiched by the sandwiching portion, wherein the sandwiching portion has a groove-shaped portion whose width dimension and depth dimension decrease from an inlet side of the second energizing terminal in an insertion direction toward a deep side of the second energizing terminal in the insertion direction.

Advantageous Effects of Invention

According to the present invention, good electrical connection can be obtained with respect to an insertion-side terminal having a large variation in a position. Objects, configurations, and effects other than those described above will be clarified from a description of embodiments provided below.

DESCRIPTION OF EMBODIMENTS

Before describing embodiments of the present invention, a configuration of an electric power steering device 1 as an example to which the present invention is applied will be briefly described with reference to FIGS. 1 and 2.

Figure 1:
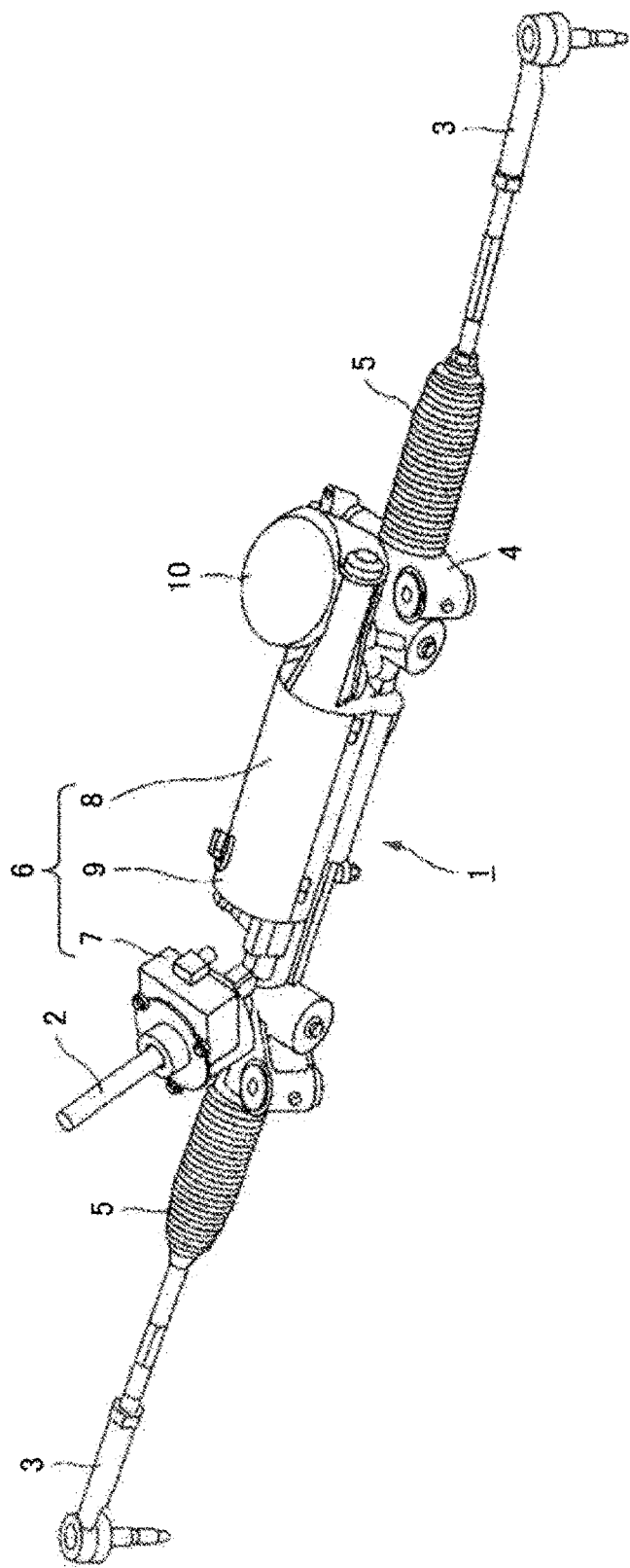
FIG. 1 is an overall perspective view of an electric power steering device as an example to which the present invention is applied.

FIG. 1 is an overall perspective view of an electric power steering device 1 as an example to which the present invention is applied.

The electric power steering device 1 is a device for steering steered wheels (usually front wheels) of a vehicle, and is configured as illustrated in FIG. 1. A pinion (not illustrated) is provided at a lower end of a steering shaft 2 connected to a steering wheel (not illustrated), and this pinion engages with a rack (not illustrated) that is elongated in a lateral direction of a vehicle body. Tie rods 3 for steering the front wheels to the left and right are connected to both ends of the rack, and the rack is covered with a rack housing 4. Rubber boots 5 are provided between the rack housing 4 and the tie rods 3.

An electric drive device 6 is provided in order to assist a torque at the time of rotationally operating the steering wheel. The electric drive device 6 includes a torque sensor 7 that detects a rotation direction and a rotation torque of the steering shaft 2, an electric motor unit 8 that gives a steering assist force to the rack via a gear 10 based on detected values of the torque sensor 7, and an electronic control unit (ECU) 9 that controls an electric motor arranged in the electric motor unit 8. The electric motor unit 8 of the electric drive device 6 is connected to the gear 10 at a plurality of places of an outer peripheral portion on an output shaft side through bolts (not illustrated), and the electronic control unit 9 is provided at an end portion of the electric motor unit 8 on an opposite side to the output shaft side. Note that the torque sensor 7 may be configured separately from the electric drive device 6.

In the electric drive device 6, when the steering shaft 2 is rotationally operated in any direction by operating the steering wheel, the torque sensor 7 detects a rotation direction and a rotation torque of the steering shaft 2, and the electronic control unit 9 calculates a drive operation amount of the electric motor based on the detected values. The electric motor is driven by a power switching element of a power conversion circuit unit 24 (see FIG. 3) based on the calculated drive operation amount, and an output shaft of the electric motor is rotated so as to drive the steering shaft 2 in the same direction as an operation direction. The rotation of the output shaft is transmitted from the pinion (not illustrated) to the rack (not illustrated) via the gear 10, such that the vehicle is steered. Configurations and operations of these are already well known, and a further description is thus omitted.

Figure 2:
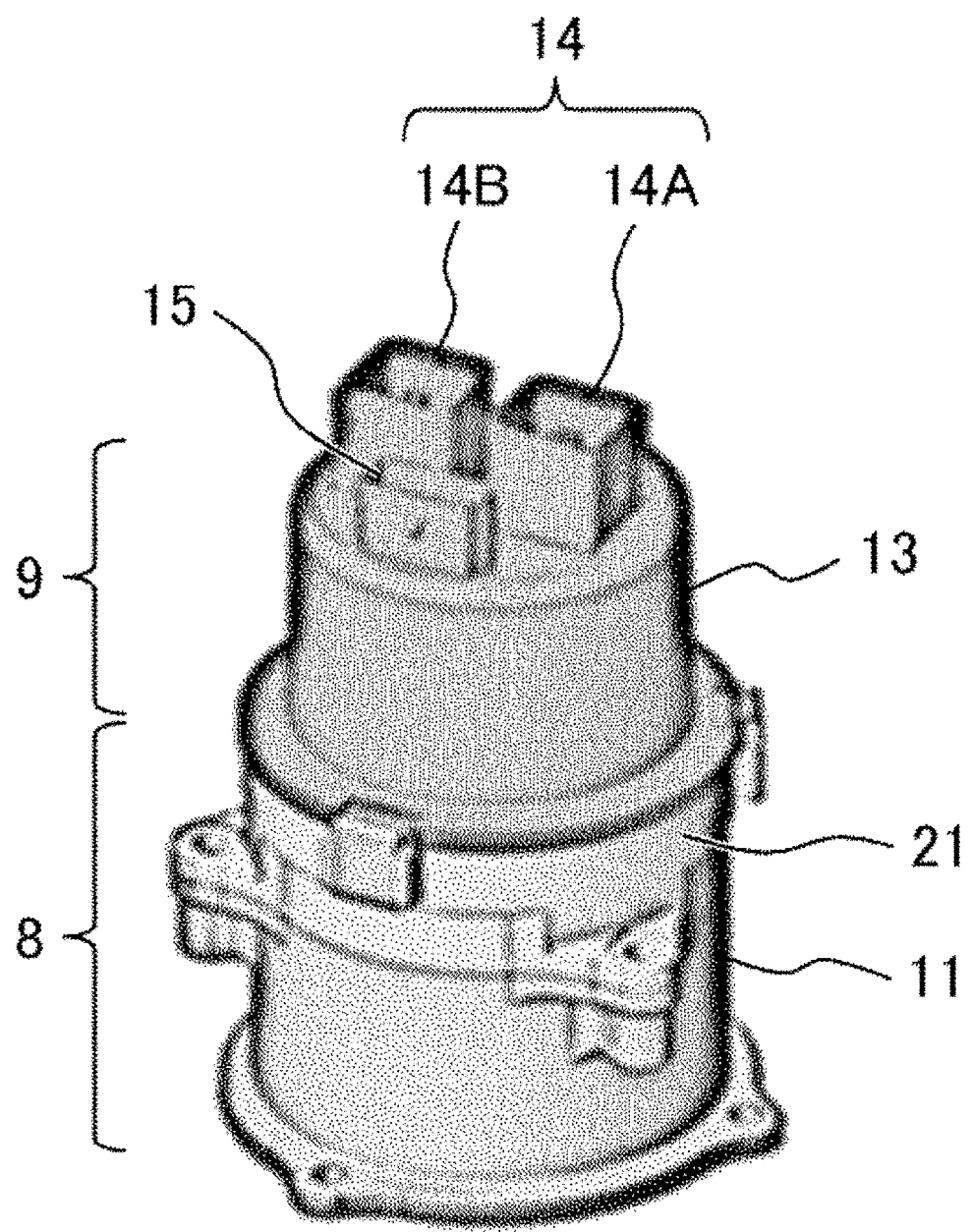
FIG. 2 is an overall perspective view of an electric drive device of the electric power steering device according to an embodiment of the present invention.

FIG. 2 is an overall perspective view of the electric drive device 6 of the electric power steering device 1 according to an embodiment of the present invention. Note that FIG. 2 illustrates an internal electronic control component assembly 22 (see FIG. 3) in a state of seeing through a cover 13.

As illustrated in FIG. 2, the electric drive device 6 is configured to include the electric motor unit 8 and the electronic control unit 9. The electric motor unit 8 includes a motor housing 11 that has a tubular portion made of an aluminum alloy or the like, and an electric motor (not illustrated) that is housed in the motor housing 11. A specific structure of the electric motor is well known, and a description thereof is thus omitted here, but a winding input terminal (winding terminal) of the electric motor is electrically connected to an output terminal of a power switching element (not illustrated) mounted on a power conversion circuit board 29 (see FIG. 3).

The electronic control unit 9 is fixed to one end portion (end portion on an opposite side to an output shaft side) of the electric motor along an axial direction of a rotary shaft (output shaft). In the present embodiment, the rotary shaft (output shaft) of the electric motor is provided below the motor housing 11 in FIG. 2. That is, the electronic control unit 9 is arranged at an end portion of the motor housing 11 on the opposite side to the output shaft side in an axial direction of the electric motor.

Here, the axial direction is a direction along the axial direction of the rotary shaft, and in the following description, the direction along the axial direction of the rotary shaft will be simply referred to as the axial direction.

Outer frame portions 14 (14A and 14B) and 15 of a plurality of connector housings are formed at an end portion (end surface) of the cover 13 on an opposite side to a motor housing 11 side (electric motor side).

A configuration of the electronic control unit 9 will be described with reference to FIG. 3.

Figure 3:
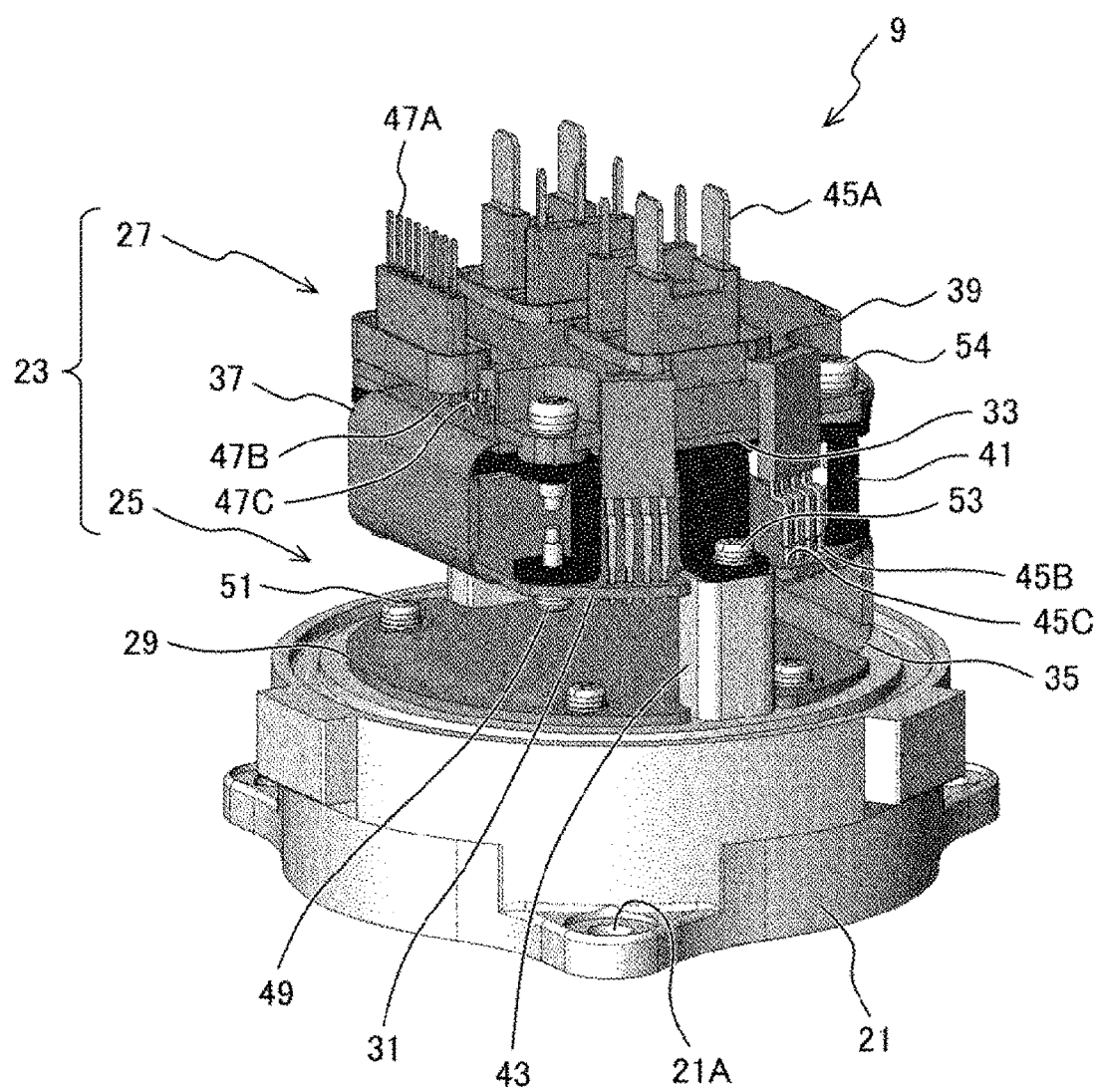
FIG. 3 is a perspective view illustrating an electronic control unit according to the embodiment of the present invention, and is a view illustrating a state in which a cover is removed.

FIG. 3 is an exploded perspective view illustrating the electronic control unit 9 according to the embodiment of the present invention, and is a view illustrating a state in which the cover 13 is removed.

The electronic control unit 9 is configured to include a basic substance 21, an electronic control component assembly 23 that is fixed to the basic substance 21, and a cover 13 (not illustrated in FIG. 3) that covers the electronic control component assembly 23.

The basic substance 21 is fixed to the motor housing 11 with bolts (not illustrated). For this reason, an outer periphery of the basic substance 21 on the motor housing 11 side is provided with a plurality of bolt insertion holes 21A through which the bolts are inserted. The basic substance 21 is a member that also serves as a heat sink that radiates heat generated by the power switching element and the like of the power conversion circuit board 29.

An end portion of the cover 13 facing the basic substance 21 is integrally fixed to the basic substance 21 by adhesion, welding, or a fastening method using fixing bolts.

The electronic control component assembly 23 housed in an internal space of the cover 13 is configured to include a circuit component assembly 25 and a connector terminal assembly 27 that has connector terminals 45A and 47A. The circuit component assembly 25 includes a power circuit unit (power circuit board) 31 that generates power necessary for the electronic control unit 9, a power conversion circuit unit (power conversion circuit board) 29 that has a power switching element including a metal oxide semiconductor field effect transistor (MOSFET), an insulated gate bipolar transistor (IGBT) or the like driving and controlling the electric motor of the electric motor unit 8, and a control circuit unit (control circuit board) 33 that controls the power switching element.

The circuit component assembly 25 is arranged in the order of the power conversion circuit unit 29, the power circuit unit 31, and the control circuit unit 33 in a direction away from the basic substance 21 and the motor housing 11, on a basic substance 21 side with respect to the motor housing 11. Among the power conversion circuit unit 29, the power circuit unit 31, and the control circuit unit 33, the power conversion circuit unit 29 is arranged at the closest position to the motor housing 11 and the electric motor, the control circuit unit 33 is arranged at the farthest position from the motor housing 11 and the electric motor, and the power circuit unit 31 is arranged between the power conversion circuit unit 29 and the control circuit unit 33. The connector terminal assembly 27 is arranged at a farther position from the motor housing 11 and the electric motor than the control circuit unit 33 is.

The power conversion circuit unit 29 has a board fixed to the basic substance 21 with bolts 51.

Circuit components such as a power switching element (not illustrated) and the like are mounted on the power conversion circuit board 29. These circuit components are already well known, and a description thereof is thus omitted here.

The control circuit portion 33 has a board fixed to a tip portion of a column 43 erected on the basic substance 21, via a spacer 41. That is, the spacer 41 is fixed to a board surface of the control circuit board 33 facing the motor housing 11 side by a fastening member (screw or bolt) 54 and is further fixed to the tip portion of the column 43 by a fastening member (screw or bolt) 53, such that the control circuit board 33 is fixed to the basic substance 21. The control circuit board 33 is mounted with a microcomputer (not illustrated) or its peripheral circuit components. These circuit components are already well known, and a description thereof is thus omitted here.

The power circuit unit 31 has a board supported by the control circuit board 33 via the spacer 41. For this reason, the power circuit board 31 is fixed to the spacer 41 by a fastening member (screw or bolt) 49. A power circuit including capacitors, coils or the like (not illustrated) is formed on the power circuit board 31. The power circuit is already well known, and a description thereof is thus omitted here.

In the power circuit board 31, the power conversion circuit board 29, and the control circuit board 33, the power circuit board 31 and the power conversion circuit board 29 are connected to each other by a first flexible portion 35 having flexibility, and the power circuit board 31 and the control circuit board 33 are connected to each other by a second flexible portion 37 having flexibility.

The power circuit board 31, the power conversion circuit board 29, and the control circuit board 33 constitute a rigid portion (rigid board) that is rigid and is not bent, and the first flexible portion 35 and the second flexible portion 37 constitute a flexible portion (flexible board) that is soft and has flexibility. The power circuit board 31, the power conversion circuit board 29, and the control circuit board 33 constitute a rigid flexible board in which the rigid portion and the flexible portion are integrated with each other, together with the first flexible portion 35 and the second flexible portion 37. The rigid flexible board only needs to have the rigid portion (rigid board) and the flexible portion (flexible board), and a material constituting the rigid flexible board is not particularly limited.

The power circuit board 31, the power conversion circuit board 29, and the control circuit board 33 are an integrally configured board component, the first flexible portion 34 and the second flexible portion 35 constitute bent portions (curved portions), and the power circuit board 31, the power conversion circuit board 29, and the control circuit board 33 are stacked in three steps (three layers) with an interval interposed therebetween to be three-dimensionally arranged. The power circuit board 31 is provided with a predetermined interval (space) between the power circuit board 31 and the control circuit board 33 by the spacer 41, and is further provided with a predetermined interval (space) between the power circuit board 31 and the power conversion circuit board 29 by the spacer 41 and the columns 43.

The connector terminal assembly 27 includes a connector terminal 45A for supplying power, a connector terminal 47A for a signal, and the like, and a synthetic resin body that molds these connector terminals. That is, the connector terminal assembly 27 is configured by molding an electric wiring member that constitutes the connector terminal 45A and an electric wiring member that constitutes the connector terminal 47A with a synthetic resin.

An end portion of the electric wiring member, which constitutes the connector terminal 45A, on a power circuit board 31 side, constitutes a power circuit board connection terminal 45C, and the power circuit board connection terminal 45C is connected to the power circuit board 31. An end portion of the electric wiring member, which constitutes the connector terminal 47A, on a control circuit board 33 side, constitutes a control circuit board connection terminal 47C, and the control circuit board connection terminal 47C is connected to the control circuit board 33.

In the present embodiment, the power circuit board connection terminal (insertion-side terminal) 45C and an accommodation-side terminal (through-hole) of the power circuit board 31 accommodating the power circuit board connection terminal 45C constitute a press-fit type connector, and electrical connection is completed by inserting the power circuit board connection terminal 45C into the accommodation-side terminal of the power circuit board 31.

In addition, the control circuit board connection terminal (insertion-side terminal) 47C and an accommodation-side terminal (through-hole) of the control circuit board 33 accommodating the control circuit board connection terminal 47C constitute a press-fit type connector, and electrical connection is completed by inserting the control circuit board connection terminal 47C into the accommodation-side terminal of the control circuit board 33. The press-fit type connector does not require soldering and can thus simplify a work for electrical connection.

The connectors formed in the power conversion circuit unit 29, the power circuit unit 31, the control circuit unit 33, and the connector terminal assembly 27 are duplicated, respectively, such that even though one of systems is failed, a function of the failed system in the other system can be supplemented.

Figure 4:
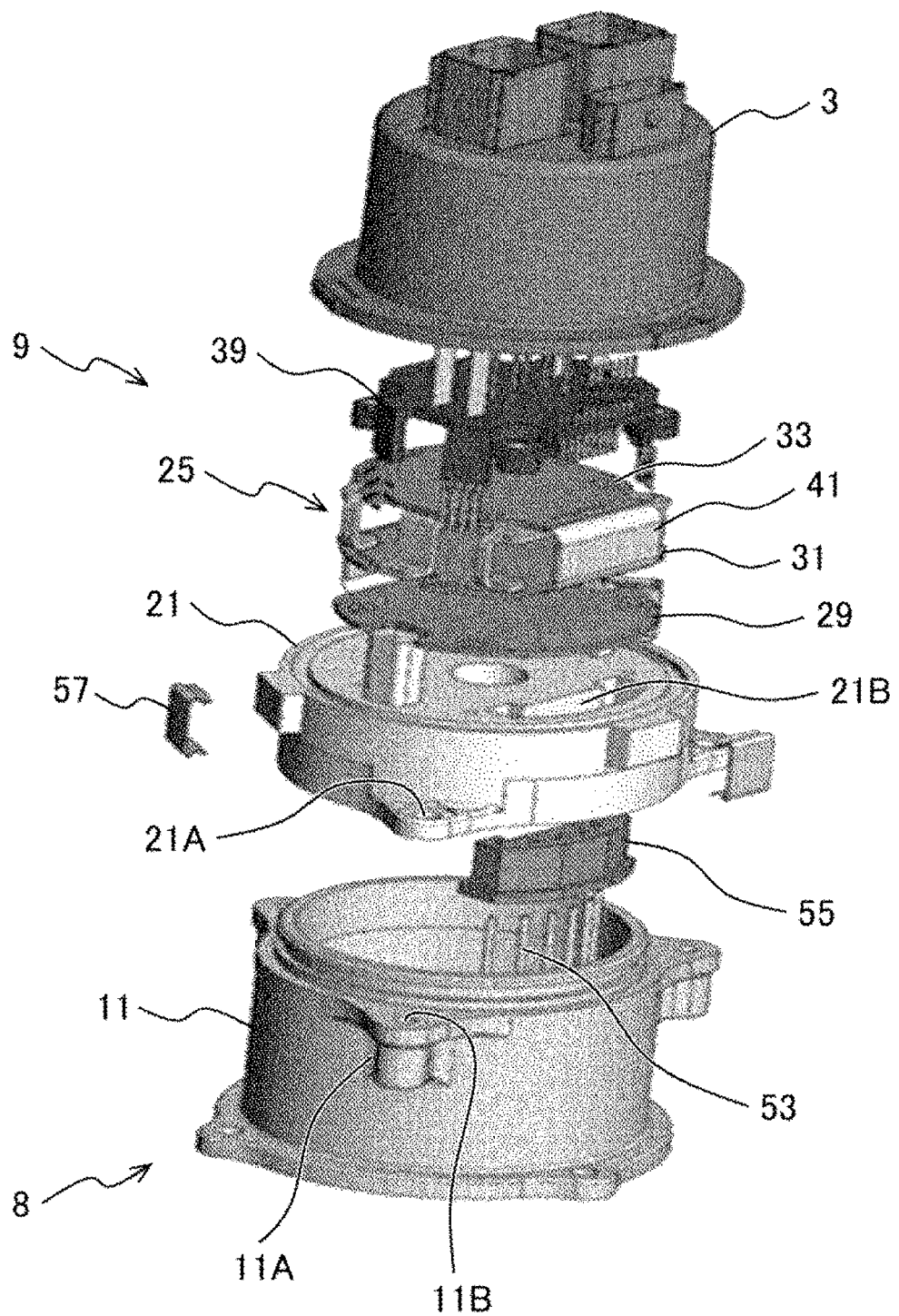
FIG. 4 is an exploded perspective view of the electric drive device according to the embodiment of the present invention.

Assembly between the electronic control unit 9 and the electric motor unit 8 will be described with reference to FIGS. 4 to 8. FIG. 4 is an exploded perspective view of the electric drive device 6 according to the embodiment of the present invention.

In the present embodiment, a form in which the cover is fixed to the basic substance 21 using clips 57 is illustrated. Adhesion may be used together with the clips to enhance a sealing property.

The electronic control unit 9 is illustrated in a disassembled state in FIG. 4, but it is assumed that the assembly of the electronic control unit 9 has been completed at a point in time when the electronic control unit 9 and the electric motor unit 8 are assembled to each other. In the present embodiment, a plurality of protrusion portions 22A protruding outward in a radial direction are formed on an outer periphery of the motor housing 11, and screw holes are formed in the protrusion portions 22A. The electronic control unit 9 is fixed to the motor housing 11 of the electric motor unit 8 by inserting bolts (not illustrated) through through-holes formed in the outer periphery of the basic substance 21 and fastening the bolts to the screw holes of the protrusion portions 22A.

The electric motor unit 8 has a stator (not illustrated) and a rotor (not illustrated). The stator is fixed inside the motor housing 11 and has a winding wound therearound. The rotor is rotatably arranged inside the stator and has a permanent magnet embedded therein. A configuration of the electric motor unit 8 is already known, and a detailed description thereof is omitted here.

In the present embodiment, as illustrated in FIG. 4, a terminal 53 of the winding is led out to an electronic control unit 9 side beyond an end portion of the motor housing 11 on the electronic control unit 9 side. A through-hole 21B is formed in a portion of the basic substance 21 of the electronic control unit 9 corresponding to a protruding position of the winding terminal 53, and a winding guide 55 is fitted in the through-hole 21B. The winding guide 55 will be described in detail later.

Note that in the present embodiment, the winding has three phases (U phase, V phase, and W phase), and two winding terminals 53 for each phase, that is, a total of six winding terminals 53 are led out.

Figure 5:
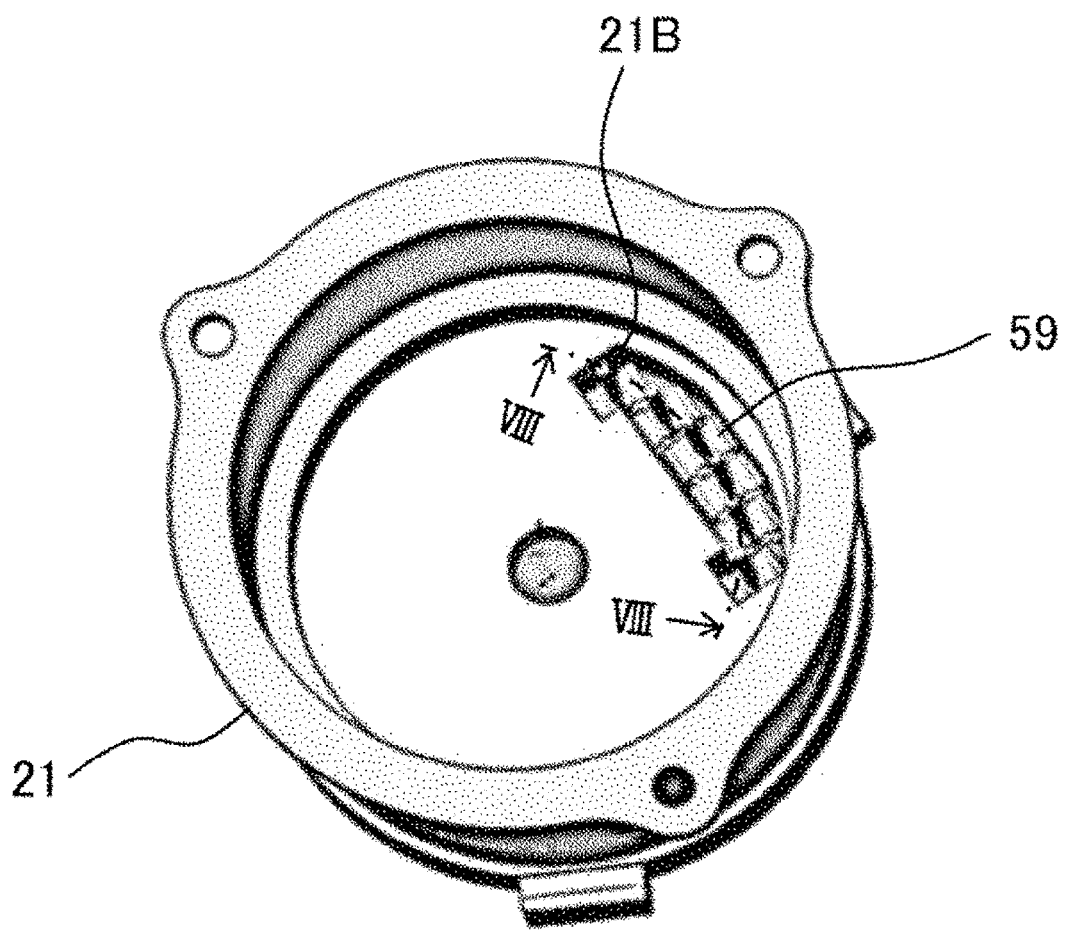
FIG. 5 is a perspective view of the electronic control unit according to the embodiment of the present invention when viewed from a motor housing side (electric motor side).

FIG. 5 is a perspective view of the electronic control unit 9 according to the embodiment of the present invention when viewed from the motor housing 11 side (electric motor side).

First, in a state in which the power conversion circuit board 29 is fixed to the basic substance 21 as illustrated in FIG. 3, an accommodation-side terminal 59 of the press-fit type connector fixed to the power conversion circuit board 29 is arranged in the through-hole 21B of the basic substance 21, as illustrated in FIG. 5.

Figure 6:
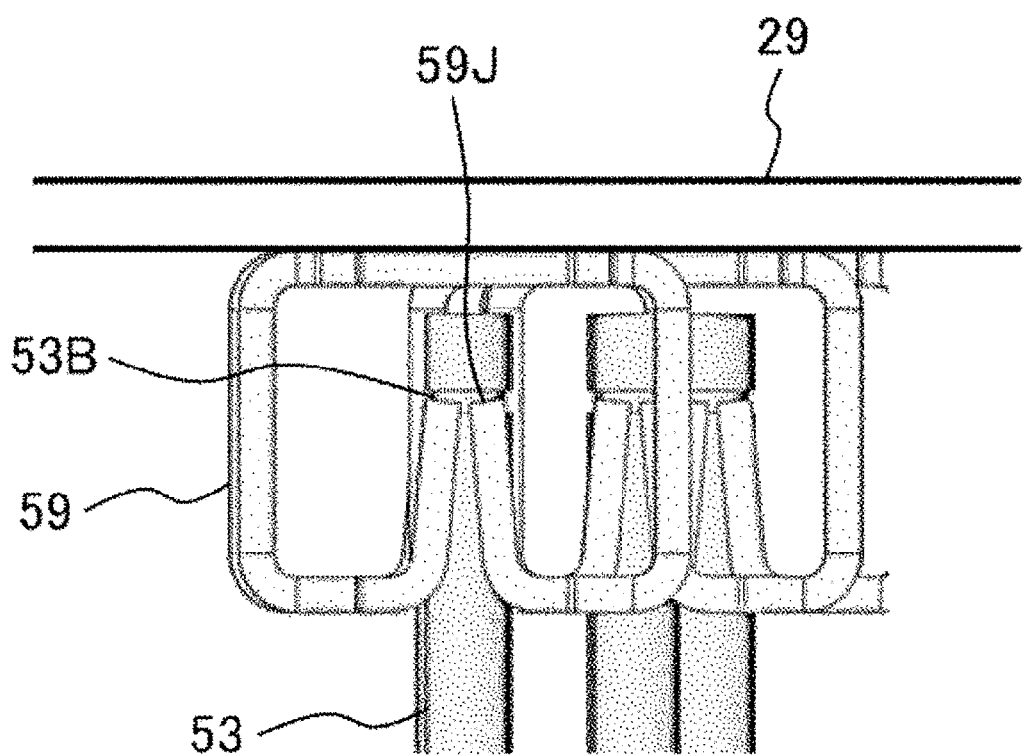
FIG. 6 is a view illustrating a connection portion electrically connecting a winding terminal to a power conversion circuit board according to the embodiment of the present invention.

FIG. 6 is a view illustrating a connection portion electrically connecting the winding terminal 53 to the power conversion circuit board 29 according to the embodiment of the present invention.

The accommodation-side terminal of the press-fit type connector may include a through-hole, but in the present embodiment, the accommodation-side terminal includes a socket-type terminal attached to a board surface.

The winding terminal 53 is inserted into the accommodation-side terminal 59 to be in pressure-contact with the accommodation-side terminal 59, such that electrical connection is completed. For this reason, an operation such as soldering, welding or the like is unnecessary.

Note that in FIG. 6, a groove 53B is provided in an outer periphery of the winding terminal 53, and the groove 53B is locked to an end portion 59J of the accommodation-side terminal 59. As a result, an effect of preventing the winding terminal (insertion-side terminal) 53 from falling off from the accommodation-side terminal 59 can be improved.

The accommodation-side terminal 59 is a terminal provided on a power conversion circuit board 29 side, and may be referred to as a board-side terminal. The insertion-side terminal 53 is a terminal provided on a winding terminal 53 side, and may be referred to as a winding-side terminal.

In addition, as illustrated in FIG. 6, a tip of the winding terminal 53 is on the motor housing 11 side (electric motor side) rather than the power conversion circuit board 29, and is not inserted into the power conversion circuit board 29. For this reason, it is not necessary to form an insertion hole of the winding terminal 53 in the power conversion circuit board 29.

Figure 7:
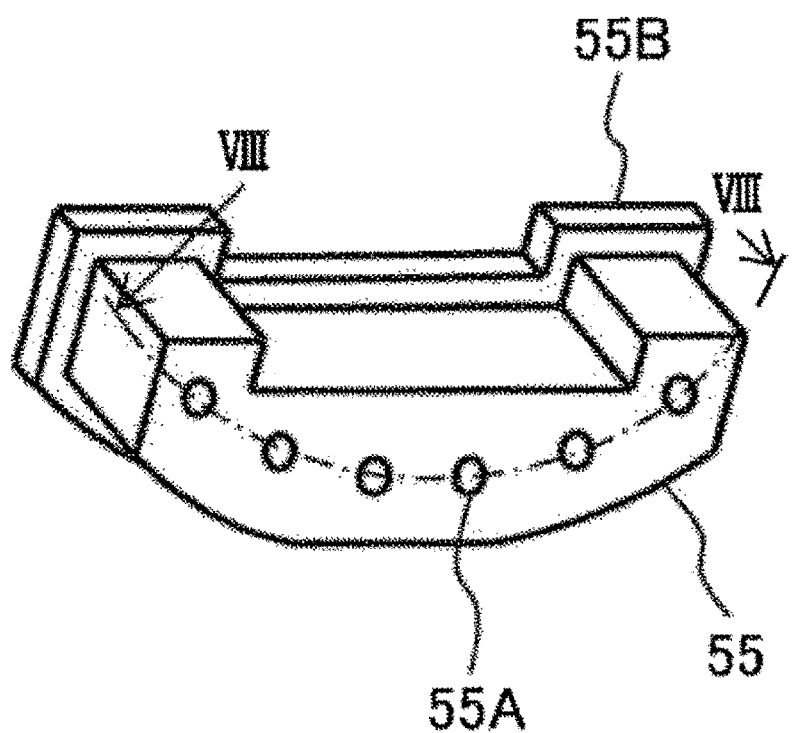
FIG. 7 is a perspective view illustrating a winding terminal guide according to the embodiment of the present invention.

FIG. 7 is a perspective view illustrating the winding terminal guide 55 according to the embodiment of the present invention.

The winding guide 55 is made of a resin and has a shape similar to that of the through-hole 21B of the basic substance 21. As a result, the winding guide 55 is attached to the basic substance 21 while ensuring a certain degree of positioning accuracy. At this time, the winding guide 55 is inserted from an opening of the through-hole 21B of the basic substance 21 on an opposite side to the power conversion circuit board 29 side into the through-hole 21B. The winding guide 55 has a through-hole (guide hole) 55A through which the winding terminal 53 is inserted, and guides the winding terminal 53 to the accommodation-side terminal 59 of the power conversion circuit board 29.

In addition, as previously illustrated in FIG. 4, the winding guide 55 is attached to the basic substance 21 from the motor housing 11 side (electric motor side). At this time, a flange portion 55B provided on one end surface 55S1 (see FIG. 8) of the winding guide 55 is locked to the basic substance 21 to determine a position of the winding guide 55 in the axial direction.

Figure 8:
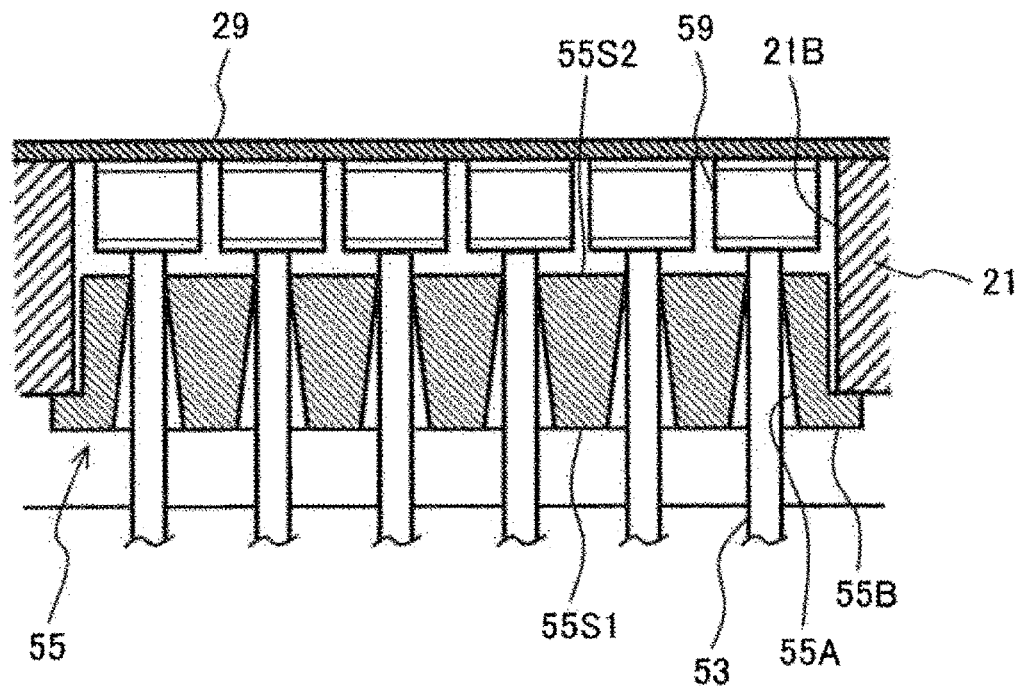
FIG. 8 is a cross-sectional view illustrating a cross section (cross section taken along VIII-VIII in FIG. 7) of the winding terminal guide according to the embodiment of the present invention.

FIG. 8 is a cross-sectional view illustrating a cross section (cross section taken along VIII-VIII in FIG. 7) of the winding terminal guide 55 according to the embodiment of the present invention. Note that in a case of the accommodation-side terminal 59, an outer shape rather than a cross section is illustrated.

The guide hole 55A of the winding guide 55 includes a tapered surface whose diameter decreases from the one end surface 55S1 toward the other end surface 55S2. In the present embodiment, the winding terminal 53 is directly connected to the accommodation-side terminal 59 provided on the power conversion circuit board 29 without using a bus bar. For this reason, a variation in a lead-out position of the winding terminal 53 before being inserted into the winding guide 55 is large.

The guide hole 55A has a large opening surface on an end surface 55S1 side and can reliably capture the winding terminal 53 whose variation in the position is large. In addition, the supplemented winding terminal 53 is guided toward the accommodation-side terminal 59 by the tapered surface, such that positional deviation of the winding terminal 53 can be corrected. As a result, a work (process) of correcting the variation in the position of the winding terminal 53 in advance or a facility for the work becomes unnecessary.

The tapered surface of the guide hole 55A reduces a reaction force at the time of correcting the positional deviation of the winding terminal 53, and improves a buckling resistance of the winding. In addition, by disposing the winding guide 55 in the vicinity of the press-fit type connector, the winding terminal 53 is supported in the vicinity of the press-fit type connector at the time of press-fitting, such that a decrease in an insertion load of the winding terminal (insertion-side terminal) 53 can be prevented. Meanwhile, in a case where the insertion of the winding terminal 53 into the accommodation-side terminal 59 is hindered (for example, a second embodiment), the winding terminal 53 can have a bending due to the guide hole 55A including the tapered surface, and a part of the insertion load can be absorbed in the bending of the winding terminal 53.

Hereinafter, an embodiment of the accommodation-side terminal 59 will be described. Note that in the present embodiment, both the passive-side terminal and the insertion-side terminal are regarded as components of the press-fit type connector portion. The passive-side terminal may be referred to as a first energizing terminal, and the insertion-side terminal may be referred to as a second energizing terminal.

First Embodiment

A first embodiment of the accommodation-side terminal 59 will be described with reference to FIGS. 9 to 13.

Figure 9:
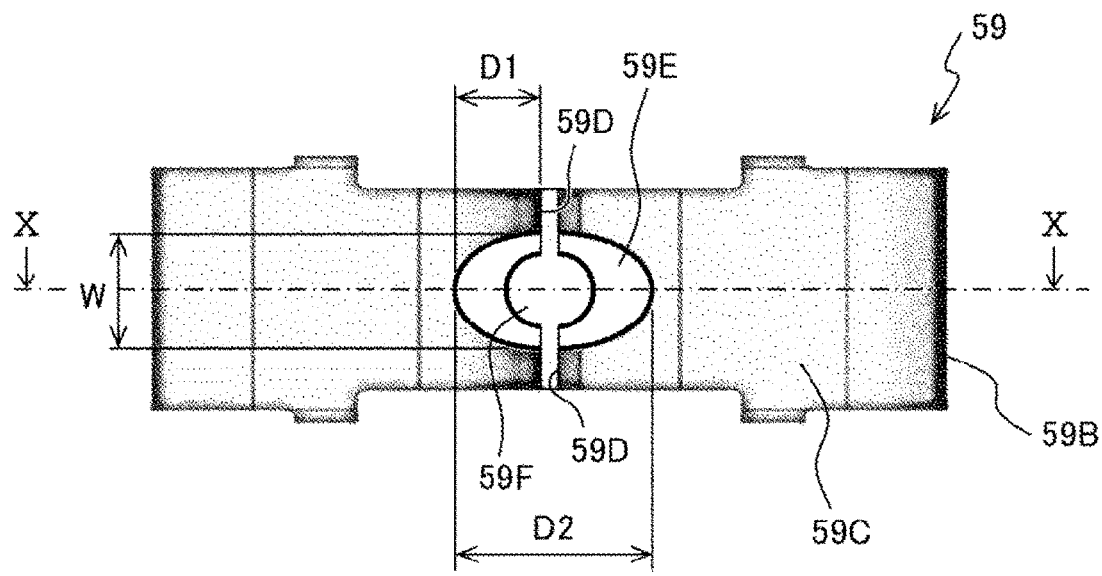
FIG. 9 is a plan view illustrating an appearance of an accommodation-side terminal of a press-fit type connector portion according to the embodiment (first embodiment) of the present invention.
Figure 10:
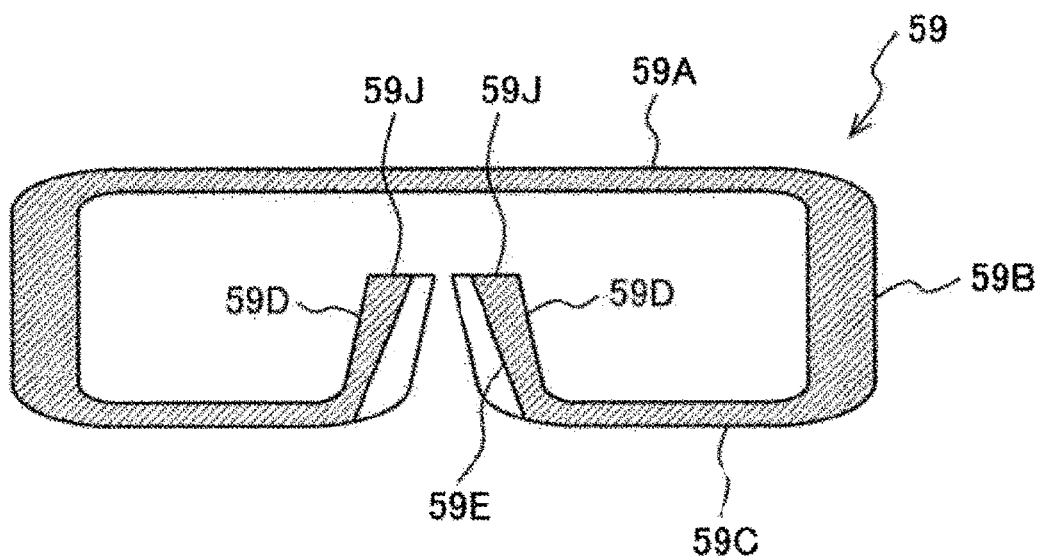
FIG. 10 is a cross-sectional view illustrating a cross section taken along X-X of FIG. 9.

FIG. 9 is a plan view illustrating an appearance of the accommodation-side terminal 59 of the press-fit type connector portion according to the embodiment (first embodiment) of the present invention. FIG. 10 is a cross-sectional view illustrating a cross section taken along X-X of FIG. 9.

The accommodation-side terminal (board-side terminal) 59 has a bottom surface portion 59A joined to the power conversion circuit board 29 by soldering, and side surface portions (standing portions) 59B rise vertically from the power conversion circuit board 29, from both side ends of the bottom surface portion 59A. Upper surface portions 59C bent in parallel with the power conversion circuit board 22 are formed at upper ends of the side surface portions 59B, and the upper surface portions 59C are further bent obliquely downward toward the power conversion circuit board 29 to form elastic terminal pieces 59D.

The accommodation-side terminal 59 is configured so that elasticity is given by bent portions (elastic terminal pieces) 59D formed by inward bending both end portions of a flat plate-shaped member made of a metal material so as to face each other. In the present embodiment, one elastic terminal piece 59D is formed by performing the bending three times from the side end portion of the bottom surface portion 59A, and one elastic terminal piece 59D for each of both side end portions of the bottom surface portion 59A, that is, a total of two elastic terminal pieces 59D are formed.

The elastic terminal pieces 59D have flat surface portions facing each other in an inclined state. When the winding terminal (insertion-side terminal or winding-side terminal) 53 is inserted between the two elastic terminal pieces 59D, the elastic terminal pieces 59D have elasticity to press tip portions 59j of the elastic terminal pieces 59D against the winding terminal 53. That is, the winding terminal 53 is sandwiched by the two elastic terminal pieces 59D. For this reason, the elastic terminal pieces 59D constitutes a sandwiching portion of the insertion-side terminal 53.

In the present embodiment, the two elastic terminal pieces 59D have groove-shaped portions 59E formed in surfaces facing each other. The groove-shaped portion 59E penetrates the elastic terminal piece 59D from an end portion of the elastic terminal piece 59D on an upper surface portion 59C side to the tip portion 59j of the elastic terminal piece 59D. For this reason, an opening 59F is formed at the tip portion 59j of the elastic terminal piece 59D by the groove-shaped portion 59E.

The groove-shaped portion 59E is formed so that a groove width dimension W and a groove depth dimension D1 become large from a tip portion 59j side of the elastic terminal piece 59D toward the upper surface portion 59C side. Further, an interval dimension D2 between the deepest parts of two groove-shaped portions 59E formed in the two elastic terminal pieces 59D also becomes large from the tip portion 59j side of the elastic terminal pieces 59D toward the upper surface portion 59C side.

That is, the groove-shaped portions 59E of the present embodiment have a tapered shape in both the width direction and the depth direction, and a groove surface of the groove-shaped portion 59E formed in one elastic terminal piece 59D has a shape in which a conical surface is parallel to a center line and a cross section including the center line is cut in half.

Figure 11:
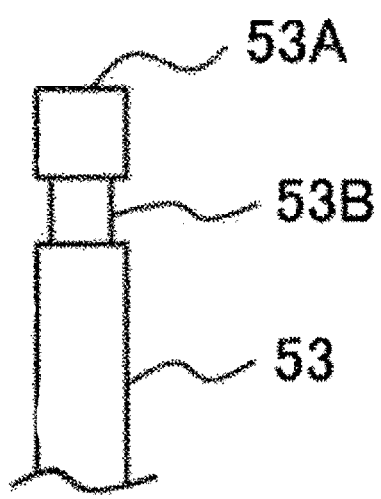
FIG. 11 is a plan view illustrating an appearance of an insertion-side terminal (winding terminal) of the press-fit type connector portion according to the embodiment of the present invention.

FIG. 11 is a plan view illustrating an appearance of the insertion-side terminal (winding terminal) 53 of the press-fit type connector portion according to the embodiment of the present invention.

With respect to the accommodation-side terminal 59 of the present embodiment, by using the winding terminal 53 having the groove 53B formed in the outer periphery thereof as illustrated in FIG. 11, the effect of preventing the winding terminal (insertion-side terminal) 53 from falling off from the accommodation-side terminal 59 can be improved, as described with reference to FIG. 6.

Figure 12:
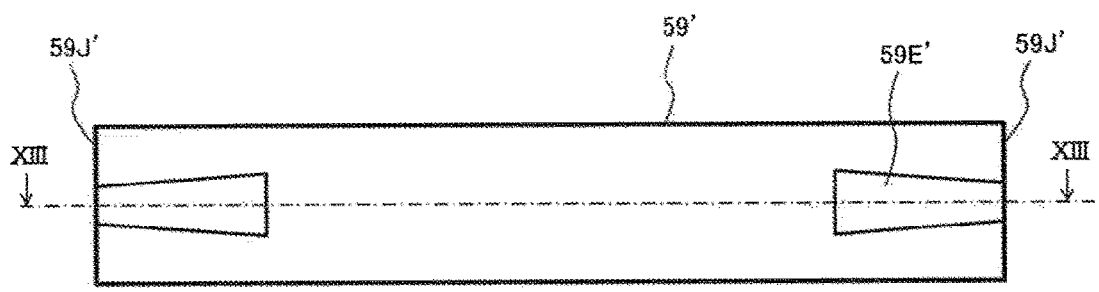
FIG. 12 is a plan view illustrating a state (shape) before bending the accommodation-side terminal of the press-fit type connector portion according to the embodiment (first embodiment) of the present invention.
Figure 13:
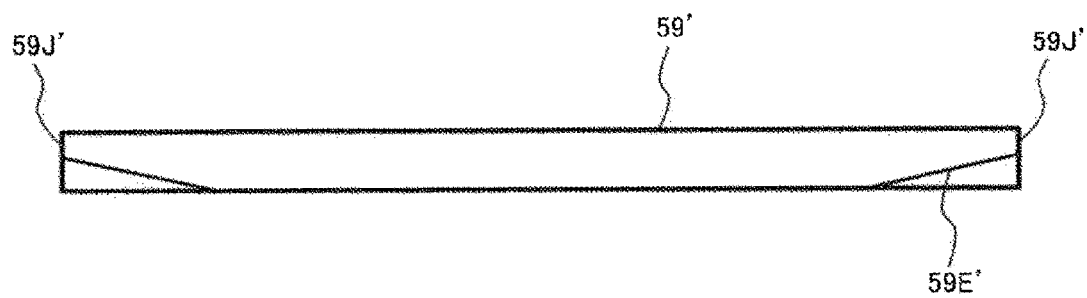
FIG. 13 is a cross-sectional view illustrating a cross section taken along XIII-XIII of FIG. 12.

FIG. 12 is a plan view illustrating a state (shape) before bending the accommodation-side terminal of the press-fit type connector portion according to the embodiment (first embodiment) of the present invention. FIG. 13 is a cross-sectional view illustrating a cross section taken along XIII-XIII of FIG. 12.

A flat plate-shaped member 59' illustrated in FIG. 12 is bent as described above, such that the accommodation-side terminal 59 is formed. Groove-shaped portions 59E' are formed at both end portions of the flat plate-shaped member 59' so that the groove-shaped portions 59E are formed after bending.

In the present embodiment, the groove-shaped portion 59E' is formed up to a side end 59J' of the flat plate-shaped member 59'.

An action and an effect of the first embodiment will be described.

By providing the groove-shaped portions 59E in the elastic terminal pieces 59D, the winding terminal 53 is guided to the groove-shaped portion 59E of the elastic terminal piece 59D against the variation in the lead-out position of the winding terminal 53, such that it is possible to reliably electrically connect the winding terminal 53 and the accommodation-side terminal 59 to each other. In this case, the guide hole 55A of the winding guide 55 reduces a large variation in the lead-out position of the winding terminal 53 to a size at which the winding terminal 53 can be inserted into the groove-shaped portion 59E.

The guide hole 55A of the winding guide 55 can have a relatively large length dimension, and can thus deal with a large variation in a position. By increasing the length dimension of the guide hole 55A, it is possible to decrease an angle of the tapered surface with respect to a center line and increase an opening area of an inlet of the tapered surface. As a result, the winding terminal 53 whose variation amount in the position is large can be reliably guided into the guide hole 55A, and a deformation amount of the winding terminal 53 at the time of correction can be decreased.

On the other hand, since it is difficult to increase a length dimension of the groove-shaped portion 59E provided in the elastic terminal piece 59D of the accommodation-side terminal 59, a variation amount in the position that can be dealt with is decreased. Therefore, in the present embodiment, the variation in the position of the winding terminal 53 is corrected in two stages using the guide hole 55A and the groove-shaped portion 59E.

The groove-shaped portion 59E of the elastic terminal piece 59D is a correction portion (final correction portion or second correction portion) that performs correction of a slight variation for final adjustment. The guide hole 55A of the winding guide 55 is a correction portion (preliminary correction portion or first correction unit) that performs pre-stage correction before the final adjustment. In particular, the groove-shaped portion 59E of the accommodation-side terminal 59 absorbs positional deviation (positional error) of the accommodation-side terminal 59.

Second Embodiment

A second embodiment of the accommodation-side terminal 59 will be described with reference to FIGS. 14 to 17.

Figure 14:
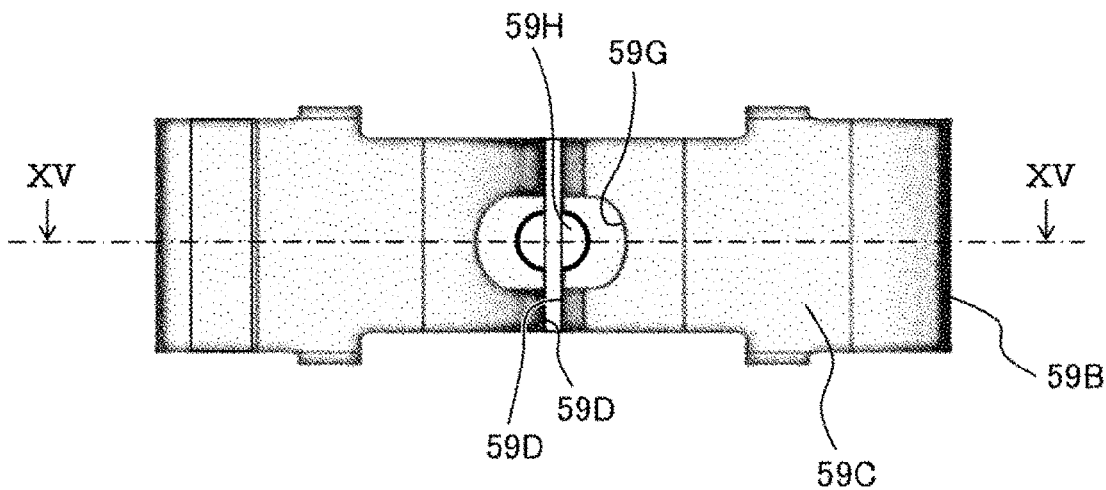
FIG. 14 is a plan view illustrating an appearance of an accommodation-side terminal of a press-fit type connector portion according to an embodiment (second embodiment) of the present invention.
Figure 15:
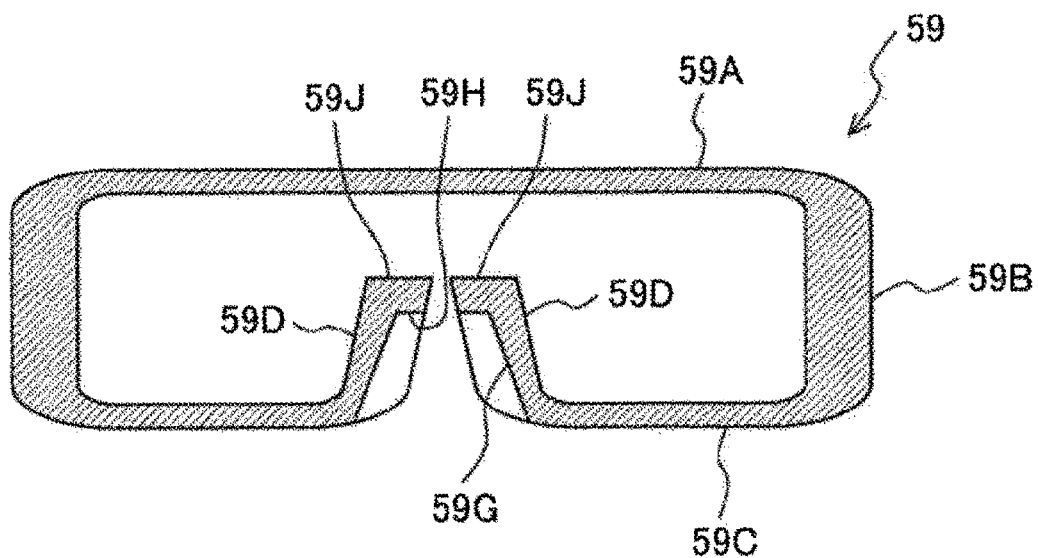
FIG. 15 is a cross-sectional view illustrating a cross section taken along XV-XV of FIG. 14.

FIG. 14 is a plan view illustrating an appearance of an accommodation-side terminal of a press-fit type connector portion according to an embodiment (second embodiment) of the present invention. FIG. 15 is a cross-sectional view illustrating a cross section taken along XV-XV of FIG. 14.

The present embodiment is different from the first embodiment in that a groove-shaped portion 59E has a shape that does not penetrate an elastic terminal piece 59D on a tip portion 59j side of the elastic terminal piece 59D. For this reason, an end portion of the groove-shaped portion 59E on the tip portion 59j side of the elastic terminal piece 59D is closed by a wall 59H. That is, a tip portion of the winding terminal (second energizing terminal) 53 in an insertion direction into the elastic terminal piece (sandwiching portion) 59D is maintained in a state of being in contact with the elastic terminal piece 59D. The other configurations are the same as those in the first embodiment, and a description thereof is thus omitted.

In the present embodiment, the winding terminal (insertion-side terminal) 53 cannot penetrate the elastic terminal piece 59D by the wall 59H. For this reason, it is not necessary to provide the groove 53B described in FIG. 11 in an outer peripheral surface of the winding terminal 53 used as the insertion-side terminal.

Figure 16:
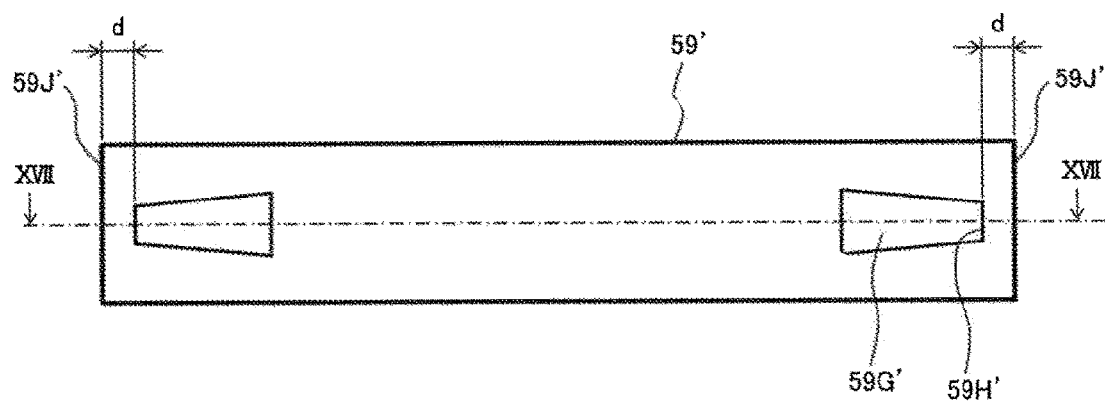
FIG. 16 is a plan view illustrating a state (shape) before bending the accommodation-side terminal of the press-fit type connector portion according to the embodiment (second embodiment) of the present invention.
Figure 17:
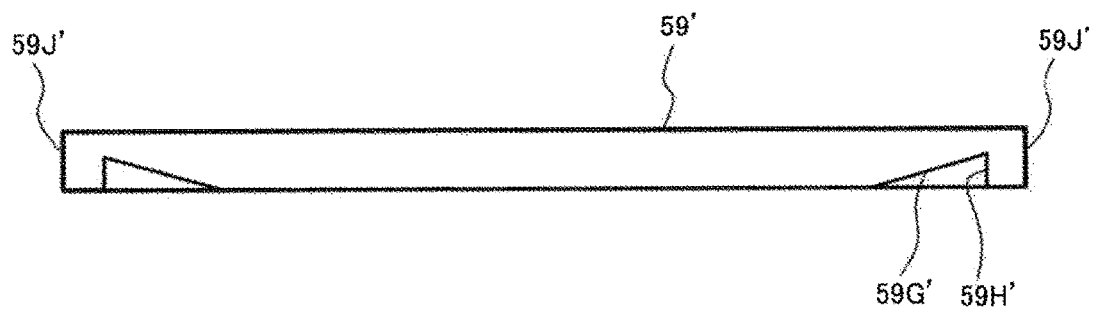
FIG. 17 is a cross-sectional view illustrating a cross section taken along XVII-XVII of FIG. 16.

FIG. 16 is a plan view illustrating a state (shape) before bending the accommodation-side terminal of the press-fit type connector portion according to the embodiment (second embodiment) of the present invention. FIG. 17 is a cross-sectional view illustrating a cross section taken along XVII-XVII of FIG. 16.

In the present embodiment, a groove-shaped portion 59E' is not formed up to a side end 59J' of a flat plate-shaped member 59', and an interval d is provided between the side end 59J' and an end portion of the groove-shaped portion 59E' on a side end 59J' side.

Also in the present embodiment, an action and an effect similar to those of the first embodiment can be obtained. Further, in the present embodiment, the groove-shaped portion 59E has a shape that does not reach the tip portion 59J of the elastic terminal piece 59D, and thus, the tip portion of the winding terminal 53 is a mechanism pushing the accommodation-side terminal 59. As a result, a binding force of the winding terminal 53 at the accommodation-side terminal 59 can be increased. Further, by bringing the tip portion of the winding terminal 53 into contact with the wall 59H of the accommodation-side terminal 59, an electrical contact resistance can be reduced.

In addition, in the first and second embodiments, by applying grease to the groove-shaped portion 59E of the elastic terminal piece 59D of the accommodation-side terminal 59, it is possible to reduce an insertion force of the winding terminal 53 and suppress generation of foreign materials at the time of inserting the wire terminal 53 or capture generated foreign materials with the grease.

Figure 18:
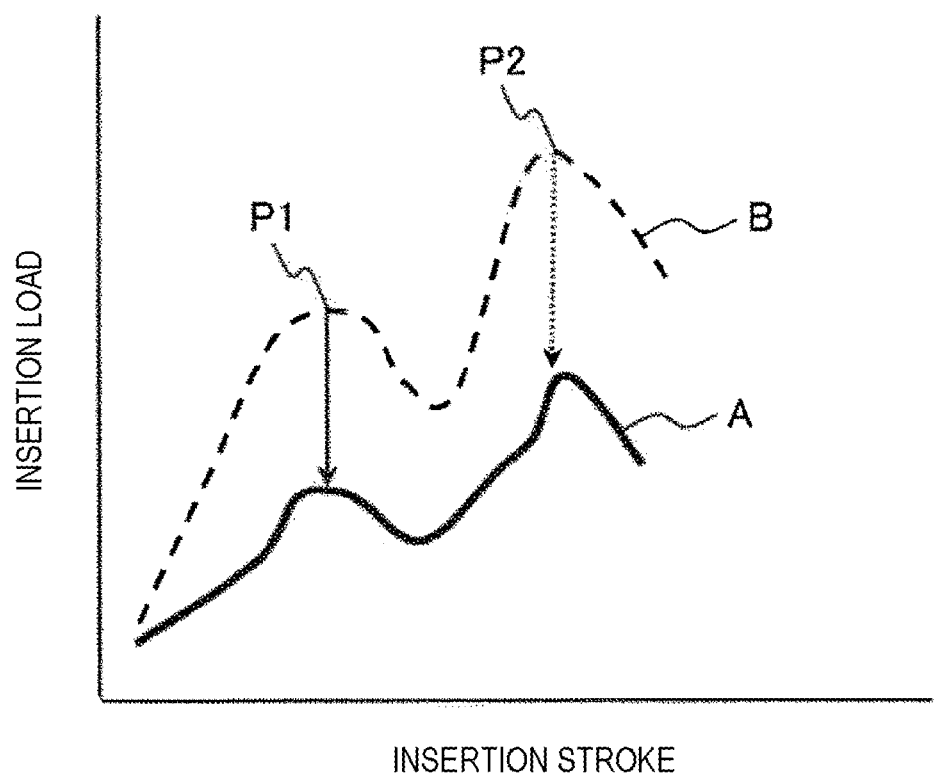
FIG. 18 is a schematic view illustrating characteristics of an insertion load at the time of inserting the insertion-side terminal (winding terminal) of the press-fit type connector portion according to the embodiment of the present invention into the accommodation-side terminal.

Next, effects of the tapered surface of the guide hole 55A and the groove-shaped portion 59E of the accommodation-side terminal 59 will be described with reference to FIG. 18. FIG. 18 is a schematic view illustrating characteristics of an insertion load at the time of inserting the insertion-side terminal (winding terminal) 53 of the press-fit type connector portion according to the embodiment of the present invention into the accommodation-side terminal 59.

Characteristic curve A is a characteristic curve in a case where the tapered surface of the guide hole 55A and the groove-shaped portion 59E having the tapered shape are provided, and characteristic curve B is a characteristic curve in a case where the tapered surface of the guide hole 55A and the groove-shaped portion 59E having the tapered shape are not provided.

As an insertion stroke of the winding terminal 53 increases, an insertion load gradually increases, reaches a first maximum value P1, and then decreases.

The increase in the insertion load until reaching the maximum value P1 is due to contact between the winding terminal 53 and the guide hole 55A. When the insertion stroke of the winding terminal 53 further increases, the insertion load starts to increase again and reaches a second maximum value P2. The increase in the insertion load and the second maximum value P2 at this time are due to contact between the winding terminal 53 and the groove-shaped portion 59E.

The maximum values P1 and P2 and the insertion loads until reaching the maximum values P1 and P2 are smaller in characteristic curve A than in characteristic curve B.

The energizing terminal assembly of the embodiment according to the present invention includes the first energizing terminal (accommodation-side terminal) 59 which constitutes the accommodation-side terminal of the press-fit type connector and has the sandwiching portion (electric terminal piece) 59D and the second energizing terminal (winding terminal) 53 which constitutes the insertion-side terminal of the press-fit type connector and is inserted into the sandwiching portion 59D to be sandwiched by the sandwiching portion 59D. The sandwiching portion 59D has the groove-shaped portion 59E whose width dimension W and depth dimension D1 decrease from an inlet side of the second energizing terminal 59 in the insertion direction toward a deep side of the second energizing terminal 59 in the insertion direction.

Further, the winding guide 55 is arranged in front of the first energizing terminal 53 in the insertion direction of the second energizing terminal 59 into the sandwiching portion 59D. The winding guide 55 has the groove-shaped portion 59E formed in the tapered surface which guides the second energizing terminal 59 to the sandwiching portion 59D.

Further, the sandwiching portion 59D of the first energizing terminal 59 includes two elastic terminal pieces facing each other, and is maintained in a state in which a tip portion of the second energizing terminal 53 in the insertion direction into the sandwiching portion 59D is in contact with the elastic terminal pieces 59D.

In addition, the electric drive device according to the embodiment of the present invention includes the electric motor, the motor housing 11 which houses the electric motor, and the electronic control unit 9 which is provided at an end portion of the motor housing 11 and controls the electric motor. The electronic control unit 9 includes the power circuit board 31 which generates the power, the power conversion circuit board 29 which has the power switching element driving and controlling the electric motor, and the control circuit board 33 which controls the power switching element. Here, the electronic control unit 9 has the energizing terminal assembly described above, the first energizing terminal 59 is fixed to the power conversion circuit board 29, and the winding terminal 53 of the electric motor is inserted into the sandwiching portion 59D of the first energizing terminal 59 as the second energizing terminal to be electrically connected to the first energizing terminal 59.

According to the embodiments described above, the following effects can be obtained.

The variation in the position of the led winding terminal can be corrected, such that assemblability and work efficiency at the time of connecting the winding terminal are improved.

In a case of the electric power steering device, the winding of the electric motor has a large heat capacity, and it is not preferable to soldering the winding terminal because a soldering time becomes long and a thermal influence on a board becomes large, but these problems can be solved in the present embodiment.

In a case where a coil wire is inserted into the board, a mounting area of a component is sacrificed. However, in the present embodiment, the winding terminal 53 is configured not to be inserted into the power conversion circuit board 29, and a board surface can thus be effectively used as a component mounting surface. This enables miniaturization of the board and a product and enables cost reduction.

Since the press-fit type connector is used for electrical connection between the electronic control unit 9 and the electric motor unit 8, the electric motor unit 8 and the electronic control unit 9 can be separated from each other, such that complication of an assembly process can be suppressed. In addition, adaptability to an output of the electric motor and variation division of functions of the electronic control unit 9 is improved. Adaptability to a model change, a design change, a production base change, or the like is improved.

Since a work such as soldering and welding becomes unnecessary, a facility for such a work also becomes unnecessary. In addition, in connection of electric wirings by the press-fit type connector, connection of a plurality of electric wirings (a total of six electric wirings of U-phase, V-phase, and W-phase in the present embodiment) can be collectively performed. For this reason, work efficiency is improved.

The work efficiency is improved, and the facility that was required in the related art is not required, such that a cost can be reduced.

Note that the present invention is not limited to each of the embodiments described above, but includes various modifications. For example, the embodiments described above have been described in detail in order to explain the present invention in an easy-to-understand manner, and are not necessarily limited to including all the components. In addition, some of the components of any embodiment can be replaced by components of another embodiment, and components of another embodiment can be added to components of any embodiment. In addition, it is possible to add, delete, and replace other components with respect to some of the components of the respective embodiments.

REFERENCE SIGNS LIST 1 power steering device
12 output shaft of electric motor
9 electronic control unit
23A power circuit board
24A power conversion circuit board
25A control circuit board
42,45 power wiring member
48,50,52 signal wiring member
26 connector terminal assembly
6 electric drive device
34 first flexible portion
35 second flexible portion
42B,43B,45B,46B power circuit board connection insertion terminal
48B,50B,52B control circuit board connection terminal
42C,43C accommodation terminal of power circuit board 23A
48C,52C accommodation terminal of control circuit board 25

The invention claimed is:

1. An energizing terminal assembly, comprising:
a first energizing terminal which constitutes an accommodation-side terminal of a press-fit type connector and has a sandwiching portion;
a second energizing terminal which constitutes an insertion-side terminal of the press-fit type connector and is inserted into the sandwiching portion to be sandwiched by the sandwiching portion,
wherein the sandwiching portion has a groove-shaped portion whose width dimension and depth dimension decrease from an inlet side of the second energizing terminal in an insertion direction toward a deep side of the second energizing terminal in the insertion direction; and
a winding guide arranged in front of the first energizing terminal in the insertion direction of the second energizing terminal into the sandwiching portion,
wherein the winding guide has a tapered surface which guides the second energizing terminal to the sandwiching portion.

2. The energizing terminal assembly according to claim 1, wherein
the sandwiching portion of the first energizing terminal includes two elastic terminal pieces facing each other, and
a state in which a tip portion of the second energizing terminal in the insertion direction into the sandwiching portion is in contact with the elastic terminal pieces is maintained.

3. The energizing terminal assembly according to claim 1, wherein
the second energizing terminal is a winding terminal of an electric motor.

4. The energizing terminal assembly according to claim 1, wherein
grease is applied to the sandwiching portion.

5. An electric drive device, comprising:
an electric motor;
a motor housing which houses the electric motor; and
an electronic control unit which is provided at an end portion of the motor housing and controls the electric motor,
wherein the electronic control unit includes a power circuit board which generates power, a power conversion circuit board which has a power switching element for driving and controlling the electric motor, and a control circuit board which controls the power switching element,
the electronic control unit has the energizing terminal assembly according to claim 1,
the first energizing terminal is fixed to the power conversion circuit board, and
a winding terminal of the electric motor is inserted into the sandwiching portion of the first energizing terminal as the second energizing terminal to be electrically connected to the first energizing terminal.

6. The electric drive device according to claim 5, wherein
the energizing terminal assembly includes a winding guide arranged in front of the first energizing terminal in the insertion direction of the second energizing terminal into the sandwiching portion, and the winding guide has a tapered surface which guides the second energizing terminal to the sandwiching portion.

* * * * *